United States Patent [19]

Cournane et al.

[11] Patent Number: 4,807,471
[45] Date of Patent: Feb. 28, 1989

[54] LEVEL MEASUREMENT FOR STORAGE SILOS

[76] Inventors: Thomas C. Cournane, 4475 de Maisonneuve Blvd. W., Westmount, PQ H3Z 1L8; Cyril F. McSweeney, 4800 de Maisonneuve Blvd. W., #217, Westmount PQ H3Z 1M2, both of Canada

[21] Appl. No.: 97,057

[22] Filed: Sep. 16, 1987

[51] Int. Cl.⁴ .................................. G01F 23/28
[52] U.S. Cl. ....................... 73/290 R; 324/58.5 B
[58] Field of Search ............... 73/290 R; 324/58.5 B

[56] References Cited

U.S. PATENT DOCUMENTS

| | | | |
|---|---|---|---|
| 3,474,337 | 10/1969 | Petrick | 73/290 R X |
| 3,572,119 | 3/1971 | Bak | 324/58.5 B X |
| 3,695,107 | 10/1972 | Hertz et al. | 73/290 R |
| 4,135,397 | 1/1979 | Krake | 73/290 R |
| 4,307,267 | 12/1981 | Peoples | 324/57 SS |
| 4,495,807 | 1/1985 | Field et al. | |
| 4,621,226 | 5/1984 | Powell | 324/58 B |
| 4,649,713 | 3/1981 | Bezek | 324/58.5 B X |

Primary Examiner—Daniel M. Yasich
Attorney, Agent, or Firm—Chilton, Alix & Van Kirk

[57] ABSTRACT

An elongated cable has a length equal to the height of the silo, whereby, when the cable is disposed in the silo, it extends from the top end to the bottom end of the silo. An electric generator for generating an AC electric signal is automatically and continuously swept through a preselected frequency range. The generator means being connected to the top end of the cable to thereby transmit the generated signal along the cable. Thus, when the generated signal is transmitted along the cable and the frequency of the generated signal is automatically and continuously swept, peak voltages will occur at frequency intervals, the frequency intervals being a function of the level of material. The frequency intervals are detected whereby to determine the level of material. Interference signals are eliminated by an adjustable impedance device at the bottom end of the cable.

5 Claims, 2 Drawing Sheets

LEVEL MEASUREMENT FOR STORAGE SILOS

BACKGROUND OF INVENTION

1. Field of the Invention

The invention relates to an apparatus for determining the level of a material in a storage silo. More specifically, the invention relates to such an apparatus which includes an AC signal generator whose output frequency is automatically and continuously swept through a predetermined frequency range.

2. Description of Prior Art

Existing devices for automatically measuring the level of material, for example, bulk powdered or granular materials, in storage silos, include capacitance probes, ultrasonic echo detectors, pressure transducers and mechanical range finders. An example of such a device is illustrated in U.S. Pat. No. 4,043,199, Greer, issued Aug. 23, 1977, which is a mechanical device and which detects pressure on a collapsible sleeve 14, which is disposed in a storage silo storing granular material, when the granular material surrounds portions of the collapsible sleeve. U.S. Pat. No. 4,495,807, Field et al, issued Jan. 29, 1985, teaches an electronic device for sensing liquid levels. Specifically, it utilizes a balanced R.F. bridge.

Capacitance probes utilize a conducting rod or cable vertically suspended inside the silo and immersed in the stored material. The electrical capacitance of the probe varies, depending on the level and dielectric properties of the stored material. This variation alters the AC or DC characteristics of an electrical circuit connected to the probe. Since the dielectric properties of the stored material depend on factors other than level, including moisture content and density, this type of device does not provide an absolute measure of level, and requires recalibration when used for material with nonconstant dielectric properties.

Ultrasonic echo detectors utilize the pulse echo technique to determine the distance from the ultrasonic transducer to the surface of the material whose level is to be measured. This device suffers severe limitations when used with granular materials in a dusty environment, due to high scattering loss at the surface of the material and high attenuation of the ultrasonic signal by dust-laden air.

Pressure transducers placed at the bottom of the storage silo produce an electrical signal proportional to the pressure in the material at that point. For most granular and powdered materials the level of the material cannot be deduced from this pressure, since pressure is a nonlinear function of depth, due to friction within the material.

Mechanical ranging devices consist of many variations of a weight suspended on a cable which is lowered until contact with the material is detected by loss of tension in the cable or other means. This device cannot provide continuous measurement due to its slow sampling rate and is unsuitable for use in environments containing abrasive dust, because of its susceptibility to mechanical breakdown.

A further approach for measuring the level of material in a storage silo or tank is illustrated in U.S. Pat. No. 3,695,107, Hertz et al, issued Oct. 3, 1972. In this patent, a delay line, consisting of an outer tubular conductor 2 and a central inner conductor 3, is disposed in the storage silo along the complete length thereof. A pulse is transmitted into the delay line from the , top end thereof, and the pulse is reflected from the air material border in the silo. The time taken for the pulse to travel to the air/material border and back is measured to thereby determine the distance from the top of the storage silo to the top of the material.

Impedance 11 is included in the bottom end of the delay line to prohibit reflections from the bottom of the delay line.

U.S. Pat. No. 4,135,397, Krake, issued Jan. 23, 1979, teaches a refinement of the system taught in the '107 patent and also includes an auxiliary transmission line 34 which is used to calibrate the measuring system.

Although the '107 and '397 patents use terminating impedances, the impedances are matched to the characteristic impedance of their respective lines presumably in open air. However, as is well known, the impedance of the line will be altered when the line is disposed in the material of the silo. Accordingly, the terminating impedances in the '107 and '397 patents will not completely eliminate reflections from the bottom ends of their respective lines.

The above described time domain devices are difficult to build because of the need to resolve subnanosecond signals for useful level resolution.

In addition, none of the patents above discussed utilize a swept frequency generator to generate a signal swept in frequency along a transmission line disposed in a silo.

SUMMARY OF INVENTION

In accordance with the invention, an apparatus for determining the level of material in a storage bin or silo includes a cable means disposed in the silo along the full length thereof. A swept frequency generator applies a swept frequency signal to the top end of the cable means. Reflections of the transmitted signal from the air-material boundary will produce peak voltages at frequency intervals. The frequency intervals are a function of the level of the material. The apparatus include means for measuring the frequency intervals and further means for determining the material level using the detected frequency intervals.

The cable means include terminating impedances which are variable in magnitude, and means for varying the magnitude of the terminating impedances during the operation of the apparatus whereby to eliminate reflections from the bottom end

BRIEF DESCRIPTION OF DRAWINGS

The invention will be better understood by an examination of the following description, together with the accompanying drawings, in which.

DESCRIPTION OF PREFERRED EMBODIMENTS

Figure 1:
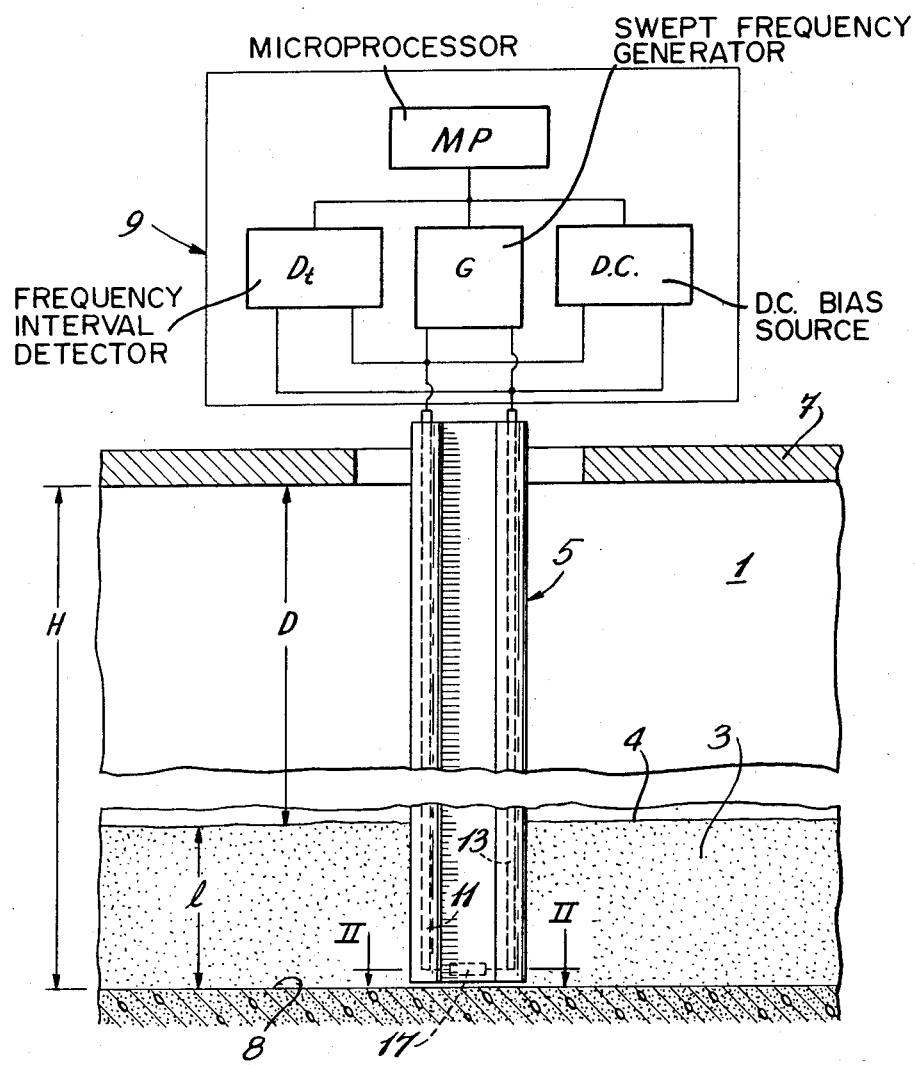
FIG. 1 illustrates one embodiment of the invention wherein the cable means comprises a single pair of parallel uniform conductors.
Figure 2:
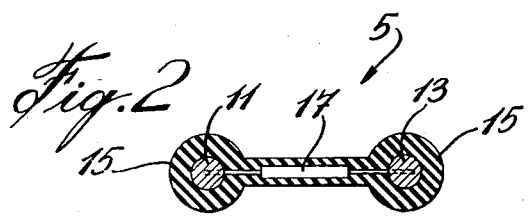
FIG. 2 is a section through II—II of FIG. 1.

Referring to FIG. 1, a storage bin or silo 1, having a height H, stores a material 3 whose top surface is at a level l above the bottom of the silo 1 and distance D below the top of the silo. The material 3 can comprise a liquid or a granular or particulate material.

A cable means, illustrated generally at 5, and having a length equal to the height H of the silo, extends from the top 7 to the bottom 8 of the silo.

Disposed at the top of the silo is electronic circuit means illustrated generally at 9. The electronic circuit means includes a swept frequency generator G, a frequency interval detector Dt, a microprocessor MP and a variable DC generator D.C.

The cable means 5 includes a pair of parallel uniform conductors 11 and 13 which are maintained in the same plane by dielectric cover 15 which covers both conductors and forms a rigid center piece between the conductors. The conductors are terminated by a variable impedance means 17, for example, a PIN diode.

The conductors 11 and 13 form an electrical transmission line which approximates closely the theoretical "distortionless" transmission line. The characteristic impedance of such a line is determined by the intrinsic impedance of the medium surrounding the conductors, and by the geometric shape of the cable cross-section. When the cable is suspended in the air, its characteristic impedance is relatively constant over a wide range of ambient conditions and can be considered to be truly resistive since the transmission line is "distortionless".

When the transmission line is immersed in a medium whose intrinsic impedance is different from that of air, the characteristic impedance of the transmission line is accordingly different from the air. When the medium has a relatively low dielectric loss angle, the impedance of the transmission line is essentially resistive and the transmission line approximates the "distortionless" condition. In this condition, the line can be effectively matched by a terminating resistive impedance.

In operation, the frequency of the generator G is automatically and continuously swept through a predetermined frequency range. The generator impresses an AC electrical signal, preferably an electrical sinusoidal signal, onto the transmission line. This signal is propogated along that portion of the transmission line suspended in air above the material 3 stored in the silo 1. At the air-material boundary 4, the impedance of the line changes abruptly causing the electrical signal to be mismatched to the impedance of the transmission line within the material. This results in a portion of the signal being reflected back towards the sending end of the transmission line from the surface of the material, and the remainder of the signal being transmitted into the portion of the transmission line immersed in the material. This transmitted signal is propagated with negligible distortion in materials having a low dielectric loss angle.

The signal reflected back from the surface of the material combines with the forward wave to form a standing wave pattern along the portion of the transmission line suspended in air. This signal is absorbed by the matched impedance of the electronic circuit, for example, a matched impedance in the generator G, and no further reflection occurs.

When the variable impedance device 17 is not adjusted to be a match with the submerged part of the transmission line, a portion of the signal propagated along the submersed part of the transmission line is reflected back towards the sending end by the mismatch which occurs at the junction of the transmission line and the unmatched impedance of the variable impedance matching device 17. The remainder of the signal is absorbed by the device. A portion of the reflected signal is transmitted through the material-air boundary and a portion is rereflected back towards the variable impedance device from the material-air boundary. The transmitted portion modifies the standing wave pattern along the portion of the transmission line in air and is absorbed by the matched impedance of the electronic circuit. The rereflected portion sets up a multiple echo which further modifies the standing wave pattern on the portion of the line in air. This multiple echo is eventually totally absorbed and attentuated and a steady state condition prevails.

On the portion of the transmission line suspended in air, the standing wave pattern which is comprised only of the signal impressed on the transmission line by the generator G and the first echo from the air-material boundary has a voltage distribution, V, along the transmission line described by the following mathematical expression:

$$V = Ae^{x\alpha}\cos(\omega t + \beta x) + \rho Ae^{x\alpha}\cos(\omega t - \beta x)$$

For a line approximating the "distortionless" condition, $\alpha$, the attenuation factor may be considered zero. The expression now becomes:

$$V = A\cos(\omega t + \omega x) + \rho A\cos(\omega t - \beta x),$$

where
$A\cos\omega t$ is the voltage expression for the signal impressed onto the transmission line by the electronic circuit:
x is the positive distance along the part of the transmission line in air, with x=o at the air material boundary:
$\beta = \omega/v$ (v=velocity of propogation for the transmission line in air), $\omega$ and t denote angular frequency and time respectively:
$\rho$=the voltage reflection coefficient in the transmission line at the air - material boundary. When the dielectric loss angle for the material is small, $\rho$ is essentially a real number, independent of frequency.

From the above, it is evident that, for the standing wave pattern comprised of the signal impressed on the transmission line by a fixed frequency generator and the first echo from the air - material boundary, the voltage varies along the portion of the transmission line suspended in air, with successive maxima (or minima) spaced by the distance equal to half the wavelength of the impressed signal. This wavelength depends only on the velocity of propagation in the transmission line suspended in air and is essentially constant for a given frequency over a wide range of ambient conditions.

In accordance with the invention, the frequency of the sinusoidal signal impressed onto the transmission line by the generator G is automatically and continuously swept through a predetermined range of values. This causes the voltage at any fixed point on the transmission line to vary. Considering only the standing wave pattern comprised of the signal impressed onto the line and the first echo from the air material boundary, this variation is in such a fashion that successive peak or null values of voltage occur at frequencies separated by a fixed frequency interval $\Delta f = v/2x$, where $v$ and x are as previously defined. When the fixed point at which the voltage is monitored is the point at which the electronic circuit is connected to the transmission line, (the top end of the transmission line) the quantity $\Delta f$ is equal to $\rho/2D$, where D is the distance along the transmission line from the point of interconnection of the , electronic circuit to the air - material boundary as shown in FIG. 1. The detector Dt automatically determines several successive values for the variable quantity $\Delta f$ as the frequency is swept over the entire measuring range.

The voltage standing wave pattern on the portion of the cable suspended in air above the stored material is modified by the multiple signal echoes caused by the impedance mismatch at the junction of the transmission line and the variable impedance device 17. This modification causes a modulation of successive values of the quantity $\Delta f$ as the frequency is swept over the entire measuring range. The microprocessor MP automatically detects and quantizes this modulation. The microprocessor then controls the DC current generator D.C. to provide a biasing current to the variable impedance device 17 which causes the resistance of the PIN diode to change. The AC resistance of the PIN is inversely proportional to the DC current flowing through it. The value of the DC current is controlled such that, by successive approximations, the resistance of the PIN diode is made to equal the impedance of the transmission line submerged in the stored material.

This causes the AC signal energy transmitted into the submersed portion of the transmission line to be effectively completely absorbed by the PIN diode. This eliminates the multiple echo interference on the standing wave pattern on the portion of the cable suspended in air and the modulation of successive values of the quantity $\Delta f$ is removed.

The microprocessor Mp automatically detects the lack of modulation on the quantity f. The circuit measures and stores this quantity and, from the relationship $D = v/2\, \Delta f$, the variable quantity D, the distance from the point of intersection of the top of the cable or silo to the top surface of the storage material, is automatically calculated in the microprocessor which receives the quantity $\Delta f$ from the detector Dt.

For any given silo, the height H is constant. This value is electrically encoded and permanently stored in the microprocessor. When a calculation of the quantity D has been completed, the value of D is automatically subtracted from H and the result is encoded into an electrical signal which is available at output terminals of the microprocessor. This signal is directly analogous to the level l of the stored material in the silo and may be used locally, or electrically transmitted to a remote point to actuate an automatic visual display or recording device, (not shown) or to feed a data processing machine.

It is evident that the measurement derived by the foregoing method for the level of bulk granular or powdered materials stored in a silo is independent of the actual value of the dielectric properties of the stored material provided that the dielectric loss angle of the material is relatively small. From the published data this is found to be true of many types of granular and powdered material. It is especially true for agricultural grain and seed materials, for the measurement of which the apparatus is particularly suited. The measurement of level in materials with a low dielectric loss angle is a function only of the velocity of propagation in the cable when the surrounding medium is the air in the empty section of the silo above the stored material. The velocity variations caused by changes in temperature, humidity, and dust content of the air are insignificant. The conductors are jacketed in a low friction plastic to prevent coating.

Figure 3:
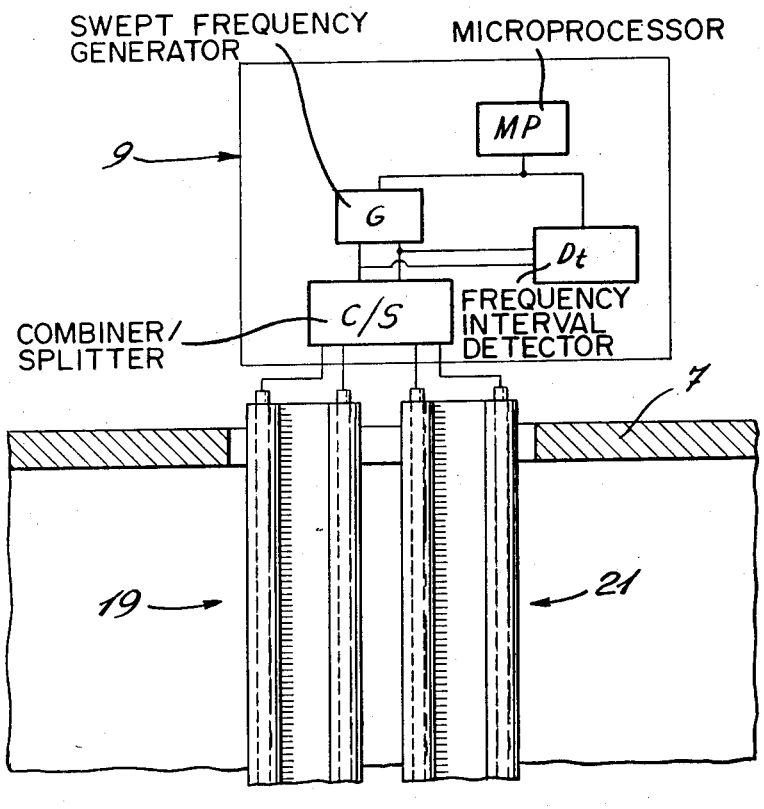
FIG. 3 illustrates an alternate embodiment of the invention including two pairs of uniform parallel conductors.
Figure 3:
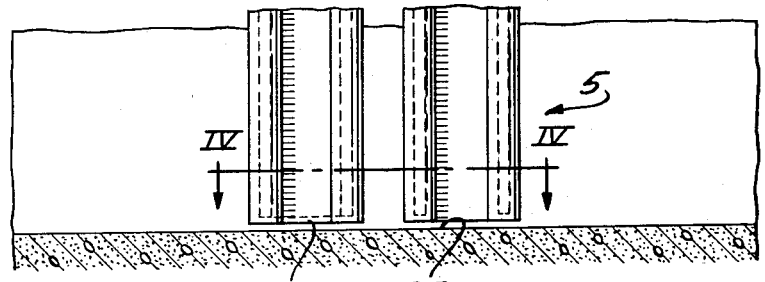

A second embodiment of the invention is illustrated in FIG. 3. As can be seen in FIG. 3, the cable means comprises two pairs of parallel uniform conductors or transmission lines 19 and 21. The transmission line 19 is terminated with a short circuit 23, while the transmission line 21 is terminated with an open circuit 25.

The electronics unit 9 in this situation consists only of the swept generator G, the frequency interval detector Dt and a combiner splitter C/S. The output of the generator is fed to the combiner splitter wherein the signal is split so that half of the signal is fed to 19 and the other half is fed to 21. The combiner splitter is also fed to the detector so that signals at the top end of the transmission lines 19 and 21 are combined and thence are combined in the combiner splitter then fed to the detector Dt. The combiner splitter preferably has a high side-to-side isolation.

As the generator signal impressed on both 19 and 21 are equal in amplitude and phase, echoes returned from the air-material surface, are in phase and will therefore add in the combiner. Echoes returned from the lower end of the pairs 19 and 21 are in anti-phase and therefore cancel in the combiner. It is pointed out that the signals are in anti-phase since the reflection coefficient for a short circuited transmission line is equal in magnitude but in anti-phase with the reflection coefficient for an open circuited transmission line when both cables are in the same intrinsic medium. Thus, the natural phase cancellation of the arrangement eliminates the interfering effects of multiple echoes and enables the quantity $\Delta f$ and, consequently the level of the material, to be determined as already described with respect to the FIG. 1 embodiment.

Figure 4:
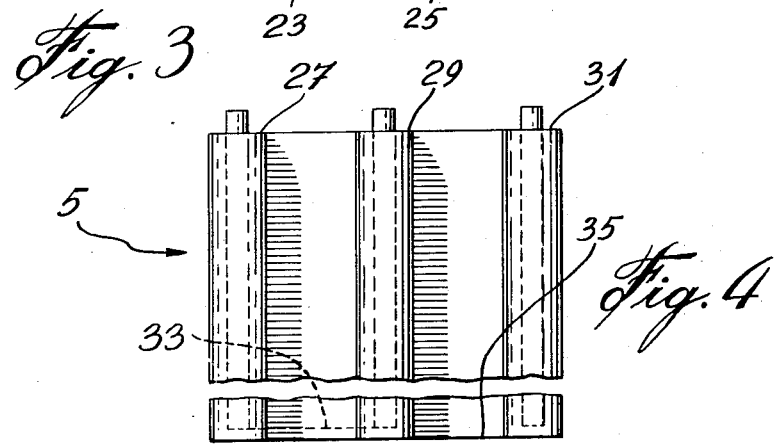
FIG. 4 is an alternate arrangement of the embodiment illustrated in FIG. 3.

A variant of the FIG. 3 embodiment is illustrated in FIG. 4. In FIG. 4, once again, there are two transmission lines formed from three uniform parallel conductors 27, 29 and 31.

One of the transmission lines is formed from the conductors 27 and 29 while the other of the transmission lines is formed from the conductors 29 and 31. Thus, one of the conductors is common to both of the transmission lines.

The transmission line formed of the conductors 27 and 29 is terminated in a short circuit 33, while the transmission line formed in the conductors 29 and 31 is terminated in an open circuit 35. In all respects, the FIG. 4 embodiment operates in the same manner as the FIG. 3 embodiment.

Although several embodiments have been described, this was for the purpose of illustrating, but not limiting, the invention. Various modification, which will come readily to the mind of one skilled in the art, are within the scope of the invention as defined in the appended claims.

I claim:

1. Apparatus for determining the level of material in a silo, comprising:
    elongated cable means having a length equal to the height of said silo and being disposed in said silo and extending along the length thereof, whereby the cable extends from the top end to the bottom end of said silo;
    generator means for generating an AC electric signal, said generator means including means for automatically and continuously sweeping the frequency of the generated signal through a pre-selected frequency range, said generator means being connected to the said cable means to thereby transmit said generated signal along said cable means;

whereby, said generated signal is transmitted along said cable means and the frequency of the generated signal is automatically and continuously swept, so that peak and null voltages will occur at frequency intervals, said frequency intervals being a function of said level of material;

means for detecting said frequency intervals;

means for determining said level connected to said means for detecting;

said generator means and said means for detecting being connected at the top end of said cable means and a portion of said signal transmitted along said cable means being reflected at the top surface of said material to provide signals proportional to said level, the remainder of said signal being reflected at the bottom end of said cable means to cause interference signals;

said cable means including means for eliminating said interference signals comprising an adjustable impedance device at the bottom end of said cable means; and means for adjusting the impedance of said adjustable impedance device to equal the impedance of the portion of the cable means submerged in said material during operation of the apparatus.

2. An apparatus as defined in claim 1 wherein said adjustable impedance device comprises a current controlled resistor such as a PIN diode;

said means for adjusting the impedance of said PIN comprising an adjustable source of D.C. current.

3. An apparatus as defined in claim 1 wherein said cable means comprises means for forming two pairs of parallel, uniform conductors;

one of said pairs being terminated at the bottom end thereof by an open circuit;

the other one of said pairs being terminated at the bottom end thereof by a short circuit;

whereby, interference signals at the top ends of said pairs are in anti-phase relationship;

means for combining said interference signals at the top ends of said pairs to thereby cancel and eliminate said interference signals.

4. An apparatus as defined in claim 3 wherein each of said pairs comprises two parallel, uniform conductors.

5. An apparatus as defined in claim 3 wherein said means for forming said two pairs comprises first, second and third parallel, uniform conductors;

a first one of said pairs being formed between said first and second conductors; and the second one of said pairs being formed between the second and third conductors.

* * * * *